United States Patent [19]

Tietz

[11] 3,837,891

[45] Sept. 24, 1974

[54] PROCESS OF STRENGTHENING POLYCRYSTALLINE REFRACTORY OXIDE FIBERS

[75] Inventor: Raymond Frank Tietz, Wilmington, Del.

[73] Assignee: E. I. du Pont de Nemours and Company, Wilmington, Del.

[22] Filed: June 30, 1972

[21] Appl. No.: 268,022

[52] U.S. Cl............ 117/46 FA, 8/115.6, 117/46 FC, 117/161 ZA, 117/169 A
[51] Int. Cl............................................. C23d 7/00
[58] Field of Search....... 117/46 FA, 46 FC, 169 A, 117/161 ZA, 46 R, 46 CA; 8/115.6

[56] References Cited
UNITED STATES PATENTS 3,158,495  11/1964  Murray et al.................. 117/46 CA
3,311,689  3/1967  Kelsey.................................. 264/59
3,681,113  8/1972  Yoldas............................ 117/46 FA Primary Examiner—William D. Martin
Assistant Examiner—Janyce A. Bell

[57] ABSTRACT

A process for strengthening polycrystalline refractory oxide fibers, particularly alumina fibers, which comprises subjecting them to a silicone-containing liquid to obtain a coating on the fiber. On subsequent heating of the coated fiber, the silicone is decomposed to silica, and the silica is vitrified into an adherent, optically uniform, thin coating. By controlling the thickness of the coating, refractory oxide fibers having improved tensile properties are obtained.

7 Claims, 1 Drawing Figure

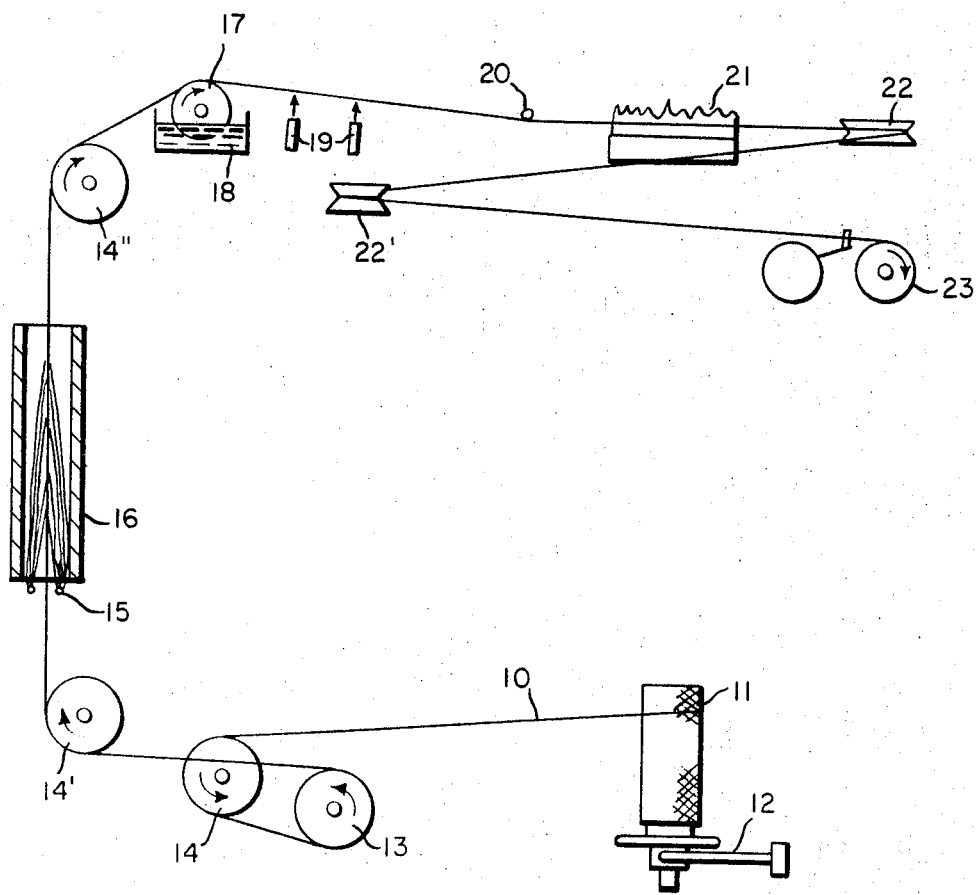

PROCESS OF STRENGTHENING POLYCRYSTALLINE REFRACTORY OXIDE FIBERS

BACKGROUND OF THE INVENTION

1. Field of the Invention

This invention relates to the field of high strength polycrystalline refractory oxide fibers, and more particularly to a process for coating refractory oxide fibers, particularly alumina fibers, with a silicone to ultimately obtain such a fiber having a coating of silica.

2. Description of the Prior Art

Polycrystalline refractory oxide fibers, particularly alumina fibers, of long lengths are very desirable due to the combination of high theoretical tensile strength and modulus coupled with chemical inertness at ambient temperature and the retention of a substantial portion of these properties at temperatures above 1,000°C. Many efforts have been made to produce such fibers as shown, for example, in Kelsey U.S. Pat. No. 3,311,689 and Blaze U.S. Pat. No. 3,327,865. However, previous fibers generally only had a fraction of the theoretical strength.

Methods have been proposed for increasing the strength of these fibers. For example, in publication AD 649,537, U.S. Department of Commerce, it has been proposed that a polycrystalline oxide fiber core and a glass sheath be extruded simultaneously. However, this method has yielded only small amounts of fibers with increased tensile strength, but with low modulus.

3. Silica-Forming Compositions

Attempts have been made to provide high strength fibers by coating the polycrystalline refractory oxide fibers with a vitrified silica coating. The fibers were coated by dipping into aqueous colloidal silica dispersion, by dipping them in silicate solutions, or by exposing them to $SiCl_4$, followed by vitrification of the coating. These coating processes have some inherent disadvantages. For example, use of colloidal silica or silicates has resulted in the adhesion of filaments (stuck together), and use of $SiCl_4$ is discouraged by its corrosive and toxic nature, as well as by the by-product HCl. All of the above-described silica-forming agents are easily decomposed to silica. It was unexpected that silicones, which are not nearly as easily transformed into silica, could be employed as a silica source.

SUMMARY OF THE INVENTION

It has now been discovered that the use of silicones overcomes the aforementioned disadvantages, and thus the process of this invention is a process for coating polycrystalline refractory oxide fiber which comprises subjecting the fiber to a silicone-containing liquid until a coating of silicone is obtained which, upon vitrification of the coating, will result in a coating of silica having an apparent thickness of less than about 1 micron thick and less than about 5 percent of the uncoated fiber diameter; followed by heating the coated fiber to a temperature and for a time sufficient to vitrify the coating into an adherent, optically uniform layer.

DESCRIPTION OF THE DRAWING

The drawing shows the series of steps used to treat the polycrystalline refractory oxide fibers with the silicone-containing liquid and the vitrification of the coated fibers. A multifilament yarn 10 of refractory oxide filaments is drawn from a bobbin 11 held by a tensioning clutch 12 by a driven roll 13 over guide rolls 14 and 14' to an annular burner 15, through chimney 16 and over guide roll 14'' to a finish roll 17 rotating in a bath of a silicone-containing liquid 18, past air-jets 19 which remove excess liquid, under guide 20, through a flame 21, and thence over tensioning devices 22 and 22' to windup 23.

DESCRIPTION OF THE INVENTION

The Silicones

Silicones are organo polysiloxanes. They can be viewed as having a repeating unit:

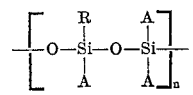

where R represents an organic group, e.g., an aliphatic or aromatic group (preferably of up to a maximum of six and nine carbons respectively), connected to the Si (silicon) atom by a carbon bond; and A can be hydrogen, R or oxygen connected to a different Si atom. Preferably, R is $CH_3$, and most preferably, R and A are all $CH_3$ (dimethyl siloxane). These compounds are described in "Organo Silicon Compounds" by C. Eaborn, Academic Press Inc., New York, 1960.

Application of Silicones to the Fibers

The silicone can be applied to the fiber as a solution, a dispersion or in the case of lower viscosity silicone fluids, in the undiluted form.

A sufficient amount of silicone is applied to provide a final layer of silica having an apparent thickness of less than about 1 micron (preferably between about 0.01 micron and about 1 micron) and less than about 5 percent of the uncoated fiber diameter. The actual amount of silica obtained will depend upon the concentration and nature of the silicone used, the number of coating cycles, the number and diameter of the fibers, and the manner of applying (and removing excess) the silicone.

Preferably, when coating a multifilament yarn, a solution containing between about 0.2 and about 40 volume percent of a silicone is used. More preferably a concentration of about 10 volume percent or less of a low viscosity silicone oil (i.e., about 5-50 centistokes at 25°C.) is used. Common solvents or diluents include methyl chloroform and carbon tetrachloride, although any compatible solvent or diluent, easily evaporated from the coated fiber, can be employed.

The silicone composition may be applied to short (staple) fibers or to continuous lengths individually or in groups (e.g., yarn or slivers) by means of bath, by passage over a surface wet with the composition, by spraying and other means. Preferably, the fiber is immersed in a bath of the silicone-containing liquid.

Excess coating composition may be removed by wipers, stripping jets, simple air flow, etc., or by vaporization during the heating step used to convert the coating to an adherent silica coating.

Any solvent or diluent present in the coating composition can be removed or reduced by ambient evaporation, forced air evaporation and/or heating.

Heating of the Coating

The silicones are converted to silica to obtain the final coating by heating the coated fiber at a temperature(s) sufficient to (1) remove any silicone solvent or diluent, (2) decompose the silicone to silica and (3) vitrify the silica coating. This can be done in separate heating steps, but it is convenient to use a single heating treatment.

The term "vitrify" is used to mean that the heating conditions are sufficient to cause sintering or melting of the silica to give a glass-like coating. At the "vitrification" temperature the solvent or diluent will be removed, as well as the silicone decomposed. The particular temperature and time sufficient to vitrify silica may be selected from reasonably broad ranges with shorter times being satisfactory at high temperatures. For example, amorphous silica may be vitrified when heated at a temperature of about 1,100°C. for many hours, when heated at a temperature of about 1,350°C. for about 30 seconds or when heated at a temperature of about 1,500°C. for about 5 seconds. A preferred method for heating silica-coated fiber comprises passing the coated fiber through the flame of a propane-air torch (generally 1,500°–1,900°C., depending on the propane/air ratio) for a residence time in the flame of about 0.1 to 5.0 seconds.

It has been observed that if the heating step is omitted or inadequate heating is employed, the coating material is not vitrified as described above and the resultant fibers exhibit substantially no increase in tensile strength opposite uncoated controls. Vitrification in situ is believed to be necessary to provide the desired adherency (discussed hereinafter) of the coating.

Although a variety of combinations of heating times and temperatures (as described above) may be used in the heating step, prolonged exposure or exposure at excessive temperatures has been observed to result in a loss of strength. This strength loss may be due to either a loss of the coating by volatilization or to diffusion of the coating into the fiber substrate.

The Polycrystalline Refractory Oxide Fibers

The term "fiber" is used in the conventional sense to mean a shaped article having a length greater than its diameter (e.g., a L/D ratio greater than 4/1, preferably greater than 10/1).

The term "polycrystalline" is used herein in the sense that the fiber comprises numerous refractory oxide crystals (rather than a single crystal).

The term "refractory oxide" is used herein in the sense that the oxide(s) exhibits a melting point of at least 1,000°C. Suitable single oxides and compositions of mixed oxides are well known and include $Al_2O_3$, $3Al_2O_3 \cdot 2SiO_2$, $Al_2O_3 \cdot AlPO_4$, $Al_2O_3 \cdot MgO$, $MgO$, $ThO_2$, $ZrO_2$, $ZrO_2 + CaO$, $ZrO_2 + MgO$, $ZrO_2 \cdot SiO_2$, $Cr_2O_3$, $Fe_2O_3$, $NiO$, $CoO$, $Ce_2O_3$, $UO_2$, $BeO$, $HfO_2$, and $TiO_2$.

A preferred fiber contains at least 60 percent of a single simple refractory oxide, which is most preferably alumina. The remaining 0 to 40 percent comprises other refractory oxides which may be present as separate phases, as a part of a compound or a solid solution with another refractory oxide. Other oxides which are not considered "refractory" such as $B_2O_3$, $P_2O_5$, $As_2O_3$, $TeO_2$ and $SiO_2$ may be present in amounts that do not reduce the melting point of the final composition below 1,000°C. Most preferably, the preferred alumina fibers will contain only up to about 5 percent of one or more oxides selected from the group consisting of cobalt oxide, magnesium oxide, lanthanum oxide, nickel oxide, copper oxide and cadmium oxide.

The fibers are comprised of grains having a median grain diameter of less than about 3 microns and less than about 10 percent of the uncoated fiber diameter. Grains within this size range are believed to provide the fiber with a high degree of internal strength which is necessary to provide the maximum strength advantage for the fibers.

The porosity of the fibers is preferably below 20 percent, most preferably 10 percent or lower. These low porosity fibers are preferred because they are strengthened to the highest level when coated according to this invention. When higher porosity fibers are similarly coated, the fibers are significantly strengthened but do not reach the absolute level of strength needed for many reinforcement applications.

A preferred alumina-containing fiber for use herein exhibits a porosity less than about 10 percent, a crystallinity greater than about 85 percent and a grain size distribution wherein substantially none of the grains are larger than about 3 microns and at least 30 percent are smaller than about 0.5 micron.

The fibers used in the process of this invention will generally have diameters between about 3 and 250 microns. Since uniform, strong fibers of these extreme diameters are more difficult to produce, the process will have greater utility with fibers having a diameter of between about 5 and 125 microns and most preferably of between about 6 and 50 microns.

Fibers especially suitable for coating to yield high strength have relatively small number of internal flaws (pores and weak grain boundaries) as indicated by transgranular cleavage when fractured. Less suitable fibers cleave along grain boundaries (intergranular) when fractured.

Preparation of Polycrystalline Refractory Oxide Fiber

Although the selection of the proper fibers is essential to this invention, the preparation of the fibers is not a part of this invention.

A preferred method as described in Offenlegungsschrift No. 1,913,663 of September, 1970 to Seufert, utilizes a two-phase spinning mix containing small particles of a refractory oxide such as alumina, zirconia, etc., in an aqueous solution of a salt convertible to a refractory oxide upon heating (termed a "precursor of a refractory oxide"). Such spinning mixes may be concentrated and/or aged by heating (e.g., about 80°C.) to improve the ability of the spinning mix to be extruded and to attenuate the extruded fiber. The spin mix is extruded through orifices and the extruded fiber attenuated to form as-spun fiber. The as-spun fiber is generally fired in two stages. The first or low temperature stage (e.g., slowly to 500° to 900°C.) removes the water and other volatile matter and may partially or completely decompose the precursor. The second or high temperature firing (e.g., 1,300° to 1,500°C.) results in the formation of oxides, sintering of the oxide grains, and development of crystallinity. Optionally a final flame firing straightens the fibers and results in further grain growth and reduction of pores.

Preparation of Alumina Fibers for the Examples

Suitable fine particles of alpha-alumina are made by classifying an aqueous dispersion (adjusted to a pH value of about 4.0 with hydrochloric acid) containing about 20 percent of finely divided aluminum oxide (XA–16, marketed by Aluminum Co. of America) by sedimentation to remove all particles larger than about 2 microns. The dispersion is concentrated to about 76 percent aluminum oxide. Using the procedure of G. A. Loomis (J. Amer. Ceramics Society 21 393, 1938) it is determined that about 100 percent of the particles in a typical classified product exhibit an equivalent spherical diameter less than 2 microns and about 89 percent exhibit a diameter less than 0.5 micron.

A spin mix is made by adding 2,780 g. of the above dispersion, 800 g. water, 36 g. $MgCl_2 \cdot 6H_2O$ and 100 g. $AlCl_3 \cdot 6H_2O$ to a water-jacketed 6-liter mixing vessel. The vessel is sealed, heated to 80°C. and stirred with a helical ribbon impeller for about 45 min., then 66 g. of concentrated HCl and 3,000 g. of alumina precursor, solid aluminum chlorohydroxide (Chlorhydrol) $Al_2(OH)_5Cl \cdot 2.2H_2O$) are added.

Mixing is continued over night.

The temperature is reduced to 56°C. and a vacuum of 27 in. Hg is applied for simultaneous deaeration and evaporation. After about 50 minutes, the temperature has been reduced to 29°C., the viscosity is 132,000 cps (286 ml. of water had been evaporated), and the mix is ready for spinning. The power required to maintain a constant stirrer speed is used to monitor viscosity changes. The spin mix is transferred to a spinning cell having a spinneret (60 holes of 4 mil diameter and 8 mil length), cap and filter assembly fixed to one end.

After the cell is charged, a nylon plug having an air purge valve is placed over the spin mix.

The cell is mounted at the top of a 9-foot long spinning column and pressure is applied to the nylon plug by a hydraulic ram. At a ram pressure of 400 psi (about 1,400 psi cell pressure) filaments are extruded through the spinneret with a total mix flow rate of about 19 g./min. A nitrogen sweep of 10.7 scfm at 183°C. is introduced at the top of the spinning column and the column air temperature is maintained at 78°C. with a spinning cell temperature of 38°C. The relative humidity is 37 percent at the bottom of the column. The 60 filament yarn is drawn at the bottom of the column by passing it around two 6-inch diameter attenuating rolls mounted one above the other — both rotating at a surface speed of 600 fpm. A spin finish of 20 percent ethyl laurate and 80 percent Perclene perchloroethylene is applied to the yarn between the attenuating rolls and bottom of the column by drawing the yarn over a wick wet with the finish. It is wound up under a tension of about 5 g. on a refractory bobbin mounted on a constant speed windup. The bobbin is made by rolling a ¼-inch thick felt of refractory fibers ("Fiberfrax" Lo-Con-Felt) to form a cylinder about 7 in. long and 3.5 in. O.D., taping the cylinder with cellophane tape, and mounting it on a collapsible metal rolled cylinder. A cake package is collected in a 15-minute period. The package, on its refractory bobbin, is placed first in a muffle furnace and heated from room temperature to 550°C. and held at this temperature for 45 min. A slow stream of nitrogen is passed through the oven during firing. The cake is then placed in a second furnace at 1,220°C., raised to 1,300°C. and held at that temperature 90 min. The furnace-fired bobbin is mounted vertically on a spindle and the yarn led over a smooth surface drive roll running at 25 fpm then vertically through a 12 inch long chimney lined with "Fiberfrax" felt to give a 1 inch I.D. The yarn passes through the center of a ring burner with 20–0.021 in. holes on a 9/16 in. circle mounted at the lower end of the chimney. This burner is fed with a mixture of propane and oxygen so as to give an apparent (uncorrected for emissivity) yarn temperature (measured with a Leeds and Northrup Model 8622-0 optical pyrometer) of 1,450° C. The flame-fired yarn is passed over a smooth surfaced roll which is rotating in a pan of water, then it is taken up on a bobbin using a constant tension windup Bouligny Model 503 at a tension of 4–4.5 g.

Similar results are obtained when the fibers are collected on a collapsible metal cylinder without the refractory felt, fired at 550° as above and then the fibers backwound from the bobbin for the flame firing above (omitting the 1,300°C. firing on the bobbin).

The method of Blaze (U.S. Pat. No. 3,322,865) and Sterry, et al. (U.S. Pat. No. 3,311,481) of extruding viscous aqueous solutions of mixed metallic salts followed by firing to refractory oxide fibers may be used to prepare fibers for use in this process.

The Coated Fiber Produced by the Process of this Invention

It has been observed in a series of coatings on the same fiber substrate that a significant increase in tensile strength over the fiber substrate is obtained when the coating is about 0.01 micron thick; and that the tensile strength increases as the coating thickness increases up to about 0.1 micron after which the tensile strength decreases.

The fibers produced by the process of this invention will have a tensile strength of at least 100,000 pounds/square inch (psi) and more preferably at least 200,000 psi. Preferred products are also characterized by an elastic modulus (flexural) of at least 40 million psi.

The process strengthens polycrystalline refractory oxide fibers since such fibers tend to have strength limiting defects associated with grain boundaries on their surface.

Although the invention is not to be limited by the theoretical explanation thereof, it is believed that the coating "heals" small surface defects in the fiber surface and it is only those portions of the fiber surface that must be coated. The required type of coating is assured by the thin optically uniform layer of material as described herein. It is further theorized that the surface defects result, at least in part, from the imperfect alignment of grains in the polycrystalline fiber at the fiber surface which creates asperities. It is therefore believed that to heal these defects, an apparent coating thickness approximately equal to one-half the median grain diameter or less is desirable (preferably the apparent coating thickness is less than one-half the median grain diameter); the asperities are filled or partially filled in this manner. When attempts are made to use larger amounts of coating, at least two problems arise. Firstly, spalling occurs, i.e., a degree or zone of coating thickness is reached whereupon the coating is no longer optically uniform due in part to its inability to withstand stresses (e.g., due to a differential thermal expansion) and the coating breaks away from the core. Secondly, if relatively thick coating (beyond the "zone of spalling") can be applied there is a sacrifice in the desirably high modulus of the refractory oxide fiber substrate due to the lesser modulus of the coating (i.e., as the volume or thickness of the relatively low modulus coating increases, the modulus of the coated fiber decreases). It is therefore believed that both the "less than about 1 micron" and the "less than about 5 percent of the fiber diameter" characterizations of the apparent coating thickness are important herein; the former assures that the required coating uniformity to provide high tensile strength is obtained, while the latter restricts the maximum required volume of coating to approximately the maximum required to completely fill asperities (since maximum grain size is less than 10 percent of fiber diameter) and assures that the coated fiber retains the desired high modulus (the maximum volume of coating based on this restriction is 17.4 percent).

The coating must adhere to the fiber substrate as described above, i.e., the coating must be optically uniform after being subjected to the cleaning procedures described hereinafter. The in situ vitrification of the process provides the desired adherence. It is believed that the coating layer is bonded to the fiber substrate through an interface (a product of a reaction between the coating and the fiber substrate). However, the interface is generally difficult to detect because it is so small.

Utility

The high strength (i.e., high tensile strength and high modulus) fibers of this process are particularly useful as reinforcing agents for plastics, metals, ceramics and other materials. These fibers may be substituted for uncoated refractory fibers in various reinforced structures, especially where high tensile strength and high modulus are desired, e.g., filament-wound radomes and sonardomes, high temperature jet-engine vanes and support structures, and truss members in air frames.

MEASUREMENT AND TESTING PROCEDURES

Presence and Uniformity of Coating

A single fiber is mounted on a microscope slide and the fiber immersed in a liquid that matches the refractive index of the substrate fiber. The fiber and liquid is covered with a cover glass. The fiber is viewed at 1,000X (100X objective and 10X eyepiece) in oil immersion (cedar oil placed between the cover glass and objective to optimize resolution) on a Phase Contrast Microscope.

Briefly, a Phase Contrast Microscope converts optical path difference, which is the product of (thickness) and (index of refraction variation), into an intensity difference in black and white which is discernible by the eye as contrast in the image. Since the immersion medium matches the substrate fiber, contrast in the image is due to variations in the index of refraction of the areas exhibiting the contrast.

The fiber is scanned along its length in phase contrast and has an optically uniform coating if a random area exhibits continuous phase contrast along both edges in the entire field of view (approximately 0.1 mm at 1,000X).

Quantity of Coating Material

The amount of silica coating present on the fiber substrate is determined by removal of the coating from a 0.5 to 1.0 gram fiber sample using a suitable etching agent that will dissolve the silica without substantially affecting the fiber substrate. For example, a 48 percent aqueous solution of hydrofluoric acid has been found satisfactory as an etching agent for silica coated alumina fibers. When etching is complete, any excess etching agent is removed by heating the sample to 900°C. This etching process is repeated until no weight difference is apparent following successive treatments. A weight correction equivalent is added to the observed weight loss to compensate for a weight change which has been observed when uncoated fibers are treated with the etching agent. For example, for silica coated alumina fiber of Example I, a weight correction that is 0.03 percent of the observed weight loss is added.

As an example of another method, fibers are fused with sodium carbonate, the melt dissolved in HCl and the solution diluted to a known volume. The concentration of silicon in the solution is obtained by using an Atomic Absorption Spectrophotometer (Model 303 by Perkin-Elmer Corp. of Norwalk, Conn.) and the weight of the coating calculated. See "Analytical Methods For Atomic Absorption Spectrophotometry" published by Perkin Elmer, Norwalk, Conn. 1971.

Apparent Coating Thickness

The apparent coating thickness (in microns, $\mu$) for a fiber of round cross section is calculated from the amount of coating material per square meter of fiber substrate surface area and the density ($d_c$) in g/cc of the coating material using the following equation:

$$\mu = g/m^2 \times (1/d_c)$$

The density ($d_c$) is determined by conventional means (a value of 2.19 g/cc is used for silica).

The quantity $g/m^2$ is calculated using the equation:

$$g/m^2 = DW/4V$$

The fiber substrate diameter ($D$), expressed in meters, is measured using a microscope equipped with a filar micrometer eyepiece. $V$ and $W$ represent the volume (in cubic meters) and weight (in grams), respectively, of the fiber substrate sample.

The apparent coating thickness for non-round fibers can be calculated in an analogous manner using photomicrographs of the coated fiber or the substrate fiber to obtain the dimensions of the substrate fiber.

Characteristics of the Coating

The vitrified nature of the coating is verified by testing the solubility of the coating in a liquid which is known to be a solvent for the coating in non-vitrified form. For example, non-vitrified silica is removed during a 2-hour immersion of the fiber in a 20 percent aqueous solution of sodium hydroxide at ambient temperature. Over the same period of time vitrified silica is substantially unaffected by this reagent.

The adherence of the coating to the substrate is verified by subjecting fiber having a substantially uniform coating (as verified by the optical procedures previously described) to a cleaning in a 0.1 percent aqueous conventional detergent (e.g., Tide) solution for 10 minutes at 50°C. with mild manual stirring. The fibers are rinsed and dried and then re-examined by the same optical procedures to determine whether the coating is still present.

Characteristics of the Fiber Substrate

Porosity of the fiber is calculated using the following equation:

$$\text{Percent Porosity} = \frac{\text{Apparent Density} - \text{Bulk Density}}{\text{Apparent Density}} \times 100$$

The apparent density is obtained using an air pycnometer and a sample size of about 0.1 g. Prior to being evaluated the fiber is fired for 2 minutes at 1,500°C. The fiber is then pulverized using a mortar and pestle to produce lengths that are no more than five times the average fiber diameter thereby minimizing any closed void content in order to obtain an apparent density value which closely approximates or equals the true density of the sample.

The bulk density is weight of fiber/area of cross section X fiber length. Fibers are straightened in a propane-air flame for bulk density measurements in order that fiber length can easily be measured. Fiber lengths are measured using a microscope equipped with a micrometer and noting the displacement required to scan the entire length of the sample. The diameter of round fibers is measured with a precision of $2.5 \times 10^{-4}$ mm. using a microscope fitted with a filar eyepiece. The area of non-circular cross sections is measured using photographs of fiber ends. Fibers are weighed on a balance capable of weighing accurately to $1 \times 10^{-7}$ gm. using a minimum sample of $1 \times 10^{-5}$ gm.

The percent crystallinity of the fiber is determined using the technique described by H. P. Klug and L. E. Alexander in "X-Ray Diffraction Procedures for Polycrystalline and Amorphous Materials," pp. 626–633, published by John Wiley & Sons, Inc., 1954. A suitable modification of this technique which is used to determine the amount of alpha-alumina present in preferred fibers of the invention is as follows:

A calibration curve for percent crystallinity versus X-ray intensity is obtained as described below.

Mixtures of alpha-alumina (100 percent crystalline) and glass (0 percent crystalline), both passing 325 mesh, are prepared containing 10 and 20 percent of the glass and homogenized using a mortar and pestle. The X-ray intensity for these mixtures and for 100 percent alpha-alumina is determined on an X-ray diffractometer equipped with a wide range goniometer, copper $K\alpha$ radiation, a nickel $\beta$ filter, ½° divergent and scatter slits, scintillation detector, and pulse height analyzer. The total amount (i.e., integrated) of diffracted intensity $(I_A)$ from 12.00° to 45.33° ($2\theta$) and the intensity $(I_B)$ from 37.00° to 40.33° ($2\theta$) is obtained using standard counting procedures as the sample is rotated at a rate of 2° ($2\theta$) per minute, all analyses being carried out in duplicate. The intensity ratio $I_A:I_B$ is then calculated and plotted versus the percent crystalline material in the sample; the best straight line is drawn through the data points.

The same intensity ratio is measured for each of the fiber samples after they are ground to pass a 325 mesh screen and the percent crystallinity is then obtained from the previously determined calibration curve. The alumina fibers used as substrates in the examples have a percent crystallinity of 85 to 100 percent.

The grain size and size distribution on the longitudinal surface of the fibers is determined from an enlarged electron micrograph following an extension of the method of John E. Hilliard described in "Metal Progress," May, 1964 pp. 99–102, and of R. L. Fullman, described in the "Journal of Metals," March, 1953, p. 447 and ff.

An etch will be necessary to remove the coating and reveal the grains but should not substantially affect the grains themselves. As an example, alumina fibers coated with silica may be etched for 30 minutes in concentrated (48 percent) hydrofluoric acid at room temperature. Standard electron microscope procedure is used to obtain electron micrographs. Carbon is deposited directly on the platinum-shadowed etched (or unetched) fibers. The fibers are completely dissolved (hot phosphoric acid at about 350°C. being used for alumina fibers) from the carbon replica which is washed and examined on the electron microscope. A representative area is photographed at about 2,500 fold magnification. The negative is then enlarged to produce a photomicrograph that exhibits 20,000 fold magnification.

Three or four circles each having a radius of 6.4 centimeters, are drawn in different areas of the enlarged micrograph so that a total of at least 100 grains will be intersected by the circumferences of all the circles. The intersections of the circumferences with each grain boundary intersecting the circumference are marked on all circles.

The length of the chord corresponding to the arc indicated on the circles for each of the grain intersections is measured and the measured lengths are tabulated in the following fractions: 1–2 millimeters, 2–4 mm., 4–8 mm., 8–16 mm., 16–32 mm., and 32–64 mm.

The average chord length, $d_{(m)}$, for each of the size fractions can be calculated by dividing the sum of the chord lengths for the size fraction by the number of grains measured in the size fraction and converting to actual dimensions in the sample in angstroms. This is converted to average grain diameter, $d_{(a)}$ by the formula of Fullman:

$$d_{(a)} = (\pi/2)\, d_{(m)}.$$

The average grain diameter and the percent of grains in each size fraction for a typical alumina fiber used in the examples follows: 0.6 $\mu$ (2 percent), 0.31 (11 percent), 0.47 (51 percent), 0.86 (34 percent), 1.57 (3 percent).

The size distribution data are plotted as cumulative percent vs. average grain diameter using log-normal probability paper (probability and logarithmic scales, the former based on the normal law of error). The best straight line is fitted to the data points between 10 and 98 percent. The average grain diameter corresponding to 50 cumulative percent on this line is the median grain diameter. A typical coated-alumina fiber of the examples has a median grain diameter of 0.43 (from above distribution).

Fiber Tensile Properties

Tensile strengths are measured at ambient room conditions using a method by R. D. Schile, et al. in "Review of Scientific Instruments," 38 No. 8, August, 1967, pp. 1,103–4. The gauge length is 0.04 inch (0.1 cm.) and the crosshead speed is 1 to 4 mils/min.

Elastic moduli (flexural modulus) are measured by vibroscope techniques as described in J. Applied Physics, Vol. 26, No. 7, 786, 792, July, 1955.

Parts and percentages in this patent are by weight unless otherwise stated.

EXAMPLE I

The alumina substrate fiber (containing about 0.2 percent MgO) that is to be coated has an average diameter of 22 microns and a tensile strength of 212,000 psi and is in the form of a bobbin of yarn (735 denier) of 60 continuous filaments.

For coating, the bobbin of yarn is mounted horizontally on a spindle and the yarn drawn under a freely rotating pulley (polytetrafluoroethylene) submerged in a silicone composition in an 8-inch long bath and then over five jets of nitrogen gas (adjusted to evaporate the bulk of any solvent diluent in the bath without breaking filaments in the yarn). The yarn is then heated to decompose the silicone and vitrify the coating by drawing it about 0.25 inch above a flame from a 1.5-inch diameter surface burner supplied with a gas-air mixture through a 50-mesh per inch stainless steel screen. The heated yarn is then cooled and wound on a bobbin at 15 feet per minute. In some cases the yarn is reheated at the same speed and the bath omitted which is indicated by multiple yarn temperature values in Table I.

Various silicone oils are used in the form of methyl chloroform solutions or undiluted silicone oil as follows:

| Code | Viscosity Centistokes at ca 25°C. | Manufacturer |
|---|---|---|
| A DC-200 | 100 | Dow Corning Corp |
| B SF-96 (2000) | 2000 | General Electric |
| C SF-97 (500) | 500 | General Electric |
| D SF-1029 | 75 | General Electric |

A, B and C are dimethyl polysiloxanes and D is a chlorophenyl methyl silicone fluid.

Table I gives the bath composition (volume percent in methyl chloroform), the temperature to which the yarn is heated (measured with a Leeds and Northrup optical pyrometer, Model 8622C). However, no emissivity correction is applied so that the actual temperature is about 400° to 600°C. or more, depending upon the fiber and coating composition, greater than the indicated temperature. Table I also gives the tensile strength of the final coated yarns after all indicated heat treatments and apparent coating thickness of the coated yarns.

Items (a–e) are examined and found to have an optically uniform coating. Item (f) has a nonuniform coating apparently as a result of excessive coating. The poor results for item (f) are believed to be due to the relatively great pick-up of the viscous silicone fluid by the yarn bundle. When a single filament of the yarn is dipped into the same fluid, drained and fired a tensile strength of 337,000 psi is obtained.

heating of the fiber at about 1,100°C. apparent is carried out. Results obtained from different volume percent solutions are given below:

| Item | Silicone in Bath | Tensile Strength psi × 10$^{-4}$ |
|---|---|---|
| a | 0.1% | 22 |
| b | 0.25% | 24 |
| c | 0.5% | 28 |
| d | 3% | 28 |
| e | 10% | 29 |
| f | 25% | 28 |
| g | 100% | 24 |

Item (b) is made from the starting fiber used for Example I (tensile of 212,000 psi) and has an apparent coating thickness of 0.01 μ.

The concentration of silicone in the bath for item (a) is too low for the single dip procedure and affords no significant increase in strength.

This silicone oil in the undiluted form is apparently too fluid for single treatments of single filaments since no gain in tensile strength is obtained after firing.

A preferred process uses a bobbin of fiber as removed from the high temperature muffle furnace. The yarn is drawn vertically through an annular propane-oxygen burner and chimney over a finish roll where a 3 percent solution of the above silicone oil in trichloroethane is applied and then through a horizontal surface burner and wound up. Appropriate driving means, guides and tensioning devices are used as shown in the drawing.

EXAMPLE III

A. A 1 percent emulsion of a low viscosity silicone oil [SF–96 (10), a poly dimethyl siloxane with a nominal viscosity of 10 centistokes at 25°C. made by the General Electric Co.] in water containing a dispersing agent is substituted for the silicone oil solution in the apparatus and procedure of Example I using the uncoated alumina filament yarn of Example II.

TABLE I

| Item | Bath Composition | Yarn Temp. °C. | Tensile psi × 10$^{-4}$ psi | Apparent Coating Thickness (μ) |
|---|---|---|---|---|
| a | 0.25% A | 1125 | 28 | 0.015 |
| b | 3% A | 1110 | 29 | 0.035 |
| c | 10% A | 1085, 1100 | 29 | 0.05 |
| d | 20% A | 1105, 1110 | 30 | 0.09 |
| e | 40% A | 1165, 1140 | 30 | 0.2 |
| f | 100% A | 1190, 1210, 1180 | 13 | 0.7 |
| g | 3% B | 1070, 1100 | 25 | 0.03 |
| h | 3% C | 1085 | 29 | 0.04 |
| i | 3% D | | 32 | 0.025 |

EXAMPLE II

An alumina substrate fiber (containing about 0.2 percent MgO) is employed that is very similar to the fiber used in Example I and is made by the same process. The yarn (620 total denier) contains 60 continuous filaments with a diameter of about 20 microns and a tensile strength of 205,000 psi.

Low viscosity (10 centistokes at 25°C.) dimethyl polysiloxanes made by the General Electric Co. (SF–99) are used undiluted or as a solution in carbon tetrachloride (methyl chloroform for item b) to coat the yarn using the procedure of Example I. A single With the yarn running at 15 feet/minute and an apparent yarn temperature of 1,075°C., the fiber strength is increased from 205,000 to 283,000 psi by the process.

B. A 3 percent aqueous emulsion of a silicone oil [obtained by diluting a commercial 35 percent emulsion (SM–62) made by General Electric Co.] is used to coat the starting alumina yarn of Example I using the apparatus of Example I. The flame is turned off and the emulsion-wet yarn collected on a bobbin. After drying 3 to 4 hours at room temperature, the yarn is then passed through the flame with an apparent temperature of 1,070°C. The filaments have an apparent thickness of silica of 0.02 micron and a tensile strength of 302,000 psi.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for strengthening a continuously advancing yarn of polycrystalline refractory oxide fibers of relatively low porosity which comprises applying a silicone-containing liquid to the advancing yarn to obtain a coating on the fibers which upon vitrification will result in a coating of silica having an apparent thickness of less than about 1 micron thick and less than about 5 percent of the uncoated fiber diameter; and then passing the continuously advancing, coated yarn through a flame, thereby heating it to an apparent temperature of 1,070°C. and above to vitrify the coating into an adherent, optically uniform layer and strengthen the yarn.

2. The process of claim 1 wherein the silicone is an organo polysiloxane, each fiber has a porosity of less than about 10 percent and residence time in the flame is 0.1–5.0 seconds.

3. The process of claim 2 wherein the organo polysiloxane is dimethyl siloxane.

4. The process of claim 1 wherein the fiber is subjected to the silicone-containing liquid until the coating of silicone will vitrify to produce a coating of silica between about 0.01 micron and 1 micron thick.

5. The process of claim 1 wherein the silicone-containing liquid contains between about 0.2 and about 40 volume percent of an organo polysiloxane and the fiber is in the form of a multifilament yarn.

6. The process of claim 5 wherein each filament has a diameter between about 3 and 250 microns, and is comprised of grains having a median grain diameter of less than about 3 microns and less than about 10 percent of the uncoated fiber diameter.

7. The process of claim 6 wherein each filament contains at least 60 percent alumina, has a porosity of less than about 10 percent, a crystallinity greater than about 85 percent, and a grain size distribution wherein substantially none of the grains are larger than about 3 microns and at least 30 percent are smaller than about 0.5 micron.

* * * * *